United States Patent
Zhang et al.

(10) Patent No.: US 6,795,756 B1
(45) Date of Patent: Sep. 21, 2004

(54) METHOD AND SYSTEM FOR CONTROLLING POWER DISTRIBUTION IN A HYBRID FUEL CELL VEHICLE

(75) Inventors: Wenjun Zhang, Troy, MI (US); Raymond Spiteri, Sterling Heights, MI (US); Thomas Howard Hunt, Farmington Hills, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/249,522

(22) Filed: Apr. 16, 2003

(51) Int. Cl.⁷ .............................................. G06F 7/00
(52) U.S. Cl. .................... 701/22; 701/99; 180/65.3; 180/65.8; 318/139
(58) Field of Search ........................ 701/1, 22, 36, 701/70, 99; 180/65.1, 65.3, 65.4, 65.8; 318/139, 140; 320/103, 104; 700/286, 295, 297

(56) References Cited

U.S. PATENT DOCUMENTS

| | | | | |
|---|---|---|---|---|
| 4,931,947 A | * | 6/1990 | Werth et al. ................ | 700/297 |
| 4,961,151 A | * | 10/1990 | Early et al. ................. | 700/297 |
| 4,962,462 A | * | 10/1990 | Fekete ........................ | 700/297 |
| 5,678,647 A | * | 10/1997 | Wolfe et al. ................ | 180/65.3 |
| 5,877,600 A | * | 3/1999 | Sonntag ...................... | 318/139 |
| 6,534,950 B2 | * | 3/2003 | LeBoe ......................... | 320/104 |
| 6,541,143 B2 | * | 4/2003 | Herdeg et al. ............... | 429/19 |
| 6,555,928 B1 | * | 4/2003 | Mizuno et al. ........... | 290/40 C |

OTHER PUBLICATIONS

U.S. patent application Ser. No. 10/249,521, Hunt et al., filed Apr. 16, 2003.
Tadaichi Matsumoto et al., SAE Technical Paper Series 2002–01–0096, entitled "Development Of Fuel–Cell Hybrid Vehicle", Toyota Motor Corp; Mar. 4–7, 2002.

* cited by examiner

Primary Examiner—Richard M. Camby
(74) Attorney, Agent, or Firm—Brooks Kushman P.C.; Carlos L. Hanze

(57) ABSTRACT

A power distribution control system for a hybrid fuel cell vehicle is provided. The system includes a high energy converter (HEC) for providing current from an electrical bus to the battery, or from the battery to the bus. As a vehicle load changes, the HEC adjusts the battery current flow. A current command is sent to a fuel cell controller so that the fuel cell current output is adjusted. As the fuel cell current output changes, the HEC further adjusts the battery current flow, until there is a zero net current flow to and from the battery. At this point, a state of equilibrium is reached and the fuel cell provides all the current required by the vehicle loads.

20 Claims, 2 Drawing Sheets

METHOD AND SYSTEM FOR CONTROLLING POWER DISTRIBUTION IN A HYBRID FUEL CELL VEHICLE

BACKGROUND OF INVENTION

1. Field of the Invention

The present invention relates to a method and system for controlling power distribution in a hybrid fuel cell vehicle.

2. Background Art

A hybrid fuel cell vehicle may include three power sources for its electrical loads: a battery, the fuel cell, and a traction motor. While powering the vehicle, the traction motor is a load, but during coast-down, the traction motor becomes a generator. This regenerative power can supply current to the other loads or be used to charge the battery. Coordinating the current flow between these sources and the continually varying electrical loads presents a fundamental control problem. Imprecise control can result in reduced fuel economy, poor performance, reliability problems, and possible electrical bus instabilities.

In addition, there are other considerations when utilizing a fuel cell in a power distribution system. For example, unlike a battery, a fuel cell may not be able to instantly supply sufficient current to meet the needs of an increased electrical load.

Therefore, the battery needs to "fill in" current temporarily, then taper off when the fuel cell's current output increases. Without the presence of the battery to temporarily supply current, performance may degrade. In addition, the battery may also provide a repository for excess fuel cell current and regenerative current during braking and coast down.

One attempt to integrate a battery into a hybrid fuel cell vehicle is described in SAE Paper No. 2002-01-0096, titled "Development of Fuel-Cell Hybrid Vehicle" ("the SAE Paper"). The SAE Paper describes the use of a battery connected in parallel with fuel cells via a DC/DC converter. The battery is configured to provide a power assist when fuel cell response is delayed, or when the vehicle is driven under high load conditions. The traction motor is located between the fuel cell and the converter; whereas, the fuel cell auxiliary systems are located between the battery and the converter. To determine the fuel cell operational point, power-current (P-I) and current-voltage (I-V) maps are used. A power requirement is input, and using the P-I and I-V maps, a voltage command is determined.

One limitation of the hybrid vehicle described in the SAE Paper is its use of operating modes which do not utilize the fuel cell, but rather, rely solely on the battery to supply all of the power. In such operating modes, all of the vehicle electrical loads are carried by the battery. This may require the use of an undesirably large battery, or place limits on the loads the system is able to handle.

In addition, the SAE Paper does not describe a system or method for controlling the rate of change of current flow to or from the battery, nor does It describe how to determine a target rate.

Accordingly, there exists a need for a method and system that provide for controlling power distribution in a hybrid fuel cell vehicle such that a fuel cell works in conjunction with a second power source, such as a battery, ultracapacitor, or other equivalent electrical storage device, to provide power to vehicle electrical loads, and a system equilibrium is sought, wherein the fuel cell carries all of the vehicle electrical loads, and the current flow of the second power source is adjusted at least partly based on a measured voltage, and at a predetermined rate, until a predetermined constant is reached.

SUMMARY OF INVENTION

Therefore, a power distribution control system for a vehicle having a fuel cell and a second power source connected to an electrical bus is provided. The control system includes a voltage regulator configured to control voltage on the bus. A first controller controls the voltage regulator. A computer is programmed and configured with fuel cell characteristics for relating fuel cell voltage to fuel cell current. The computer is further programmed and configured to receive a current request at least partly based on vehicle loads, and to determine a first voltage related to the current request using the fuel cell characteristics. A second controller is configured to receive a voltage signal from the computer and to provide a current command to the first controller. The voltage signal is at least partly based on the first voltage and a measured voltage.

Some embodiments of the invention also include a power distribution control system having electrical loads connected directly to the fuel cell, which provides a low cost, efficient architecture. Since main power current can go directly from the fuel cell to the loads without passing through another device, the battery and voltage regulator size can be minimal. This may result in an overall cost savings.

In addition, embodiments of the invention may utilize a single voltage sensor to measure a voltage on the electrical bus to help control the voltage regulator. Because voltage sensors are often used to provide voltage measurements to other vehicle systems, a separate voltage sensor may not be needed in the present invention. Moreover, the use of a single voltage sensor, rather than multiple sensors, may provide an overall cost savings.

The invention also provides a method of controlling the power distribution in a vehicle having a fuel cell and a second power source. The method includes generating a first voltage based on a vehicle electrical load change. A first current command is generated at least partly based on the first voltage and a measured voltage. Current flow of the second power source is adjusted at least partly based on the first current command, and the available fuel cell current is adjusted at least partly based on the vehicle electrical load change. The current flow of the second power source is continuously adjusted at least partly based on additional current commands until an equilibrium point is reached.

The invention further provides a vehicle having a fuel cell and a second power source connected to an electrical bus, and a power distribution system for controlling the distribution of power in the vehicle. The power distribution system includes a voltage regulator configured to control the voltage on the bus. A first controller controls the voltage regulator, and a computer is programmed and configured with fuel cell characteristics for relating fuel cell voltage to fuel cell current. The computer is further programmed and configured to receive a current request at least partly based on vehicle loads. The computer is also programmed and configured to determine a first voltage related to the current request using the fuel cell characteristics. A second controller is configured to receive a voltage signal from the computer, and to provide a current command to the first controller. The voltage signal is at least partly based on the first voltage signal and a measured voltage.

The invention also provides a controller for controlling the power distribution in a vehicle having a fuel cell and a second power source. The controller includes an algorithm for generating a first voltage at least partly based on vehicle electrical loads, for generating a current command at least partly based on the first voltage and a measured voltage, for adjusting current flow of the second power source at least partly based on the current command, for adjusting available fuel cell current at least partly based on the vehicle electrical loads, and for continuously adjusting the current flow of the second power source until an equilibrium point is reached.

The above object and other objects, features, and advantages of the present invention are readily apparent from the following detailed description of the best modes for carrying out the invention when taken in connection with the accompanying drawings.

DETAILED DESCRIPTION

Figure 1:
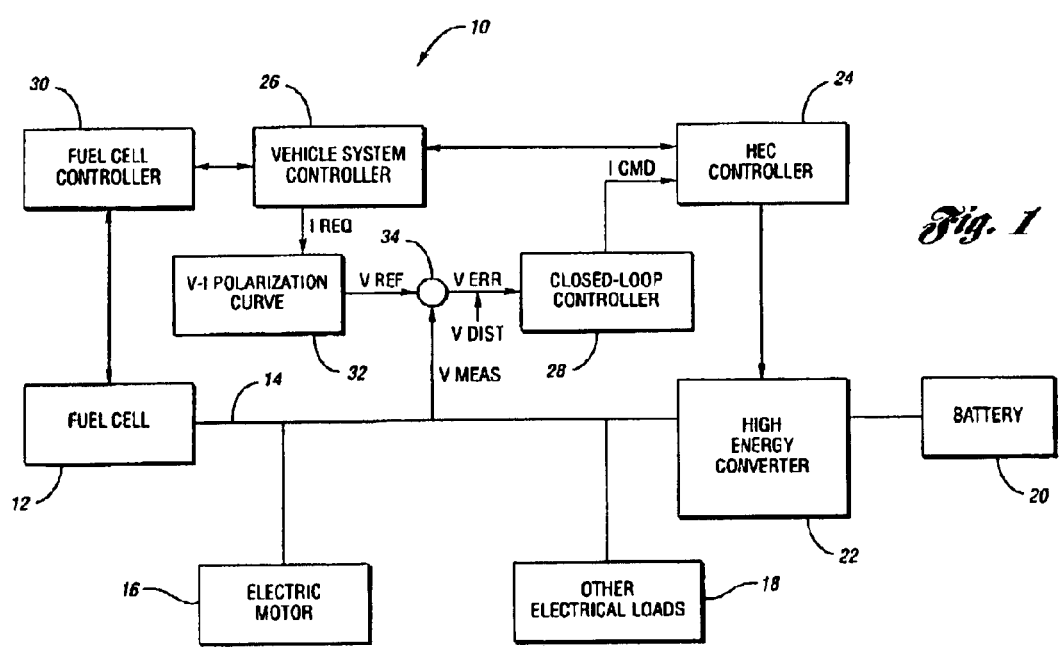
FIG. 1 is a control diagram illustrating the system of the present invention.

FIG. 1 is a control diagram illustrating a system 10 in accordance with the present invention. In this embodiment, the system 10 is part of a hybrid fuel cell vehicle (not shown). A fuel cell 12 is connected to a high voltage bus 14, and supplies current directly to all the electrical loads. The fuel cell 12 may be considered a fuel cell subsystem, including both a fuel cell stack, and a fuel cell auxiliary system, such as an air compressor and/or a deionized heater. The electrical loads as shown in FIG. 1 include an electric motor 16 and all other electrical loads 18.

The electrical loads 18 may include many different types of loads. For example, the electrical loads 18 may include an inverter for receiving direct current from the bus 14, and for providing alternating current to the motor 16. Other types of electrical loads include heating, ventilating, and air conditioning (HVAC) systems, water pumps, fans, a power steering pump, and various low voltage systems for running electronic components within the vehicle. It is understood that different vehicles will have different components connected to the bus 14.

A second power source, or battery 20, is connected to the bus 14 through a voltage regulator, or high energy converter 22 (HEC). The term "second" power source merely implies a power source in addition to the fuel cell 12. Although the second power source in this embodiment is a battery, and in particular a nickel metal hydride battery, it could be virtually any type of power source capable of supplying and receiving current. Other examples of a second power source include a lead acid battery and an ultra-capacitor.

The HEC 22 is a bidirectional buck-boost voltage regulator that can source current onto the bus 14 from the battery 20, or it can take current off the bus 14 and place it into the battery 20. The latter function is commonly referred to as regeneration. The HEC 22 is referred to as a "buck-boost" voltage regulator because it has the ability to increase, or boost, the voltage of the battery 20 to match the voltage of the bus 14, or alternatively, reduce, or buck, the voltage of the battery 20 to match the voltage of the bus 14.

The system 10 includes a first controller, or HEC controller 24, and a computer, or vehicle system controller (VSC) 26. The VSC 26 is responsible for the overall control and monitoring of the vehicle. Although shown in FIG. 1 as separate components, at least a portion of the HEC controller—e.g., a digital portion—may be integrated into the VSC 26. That is, the HEC controller 24 may be a software controller, part of a control algorithm that the VSC 26 is programmed and configured to execute. Of course, a HEC controller, such as the HEC controller 24, may be a physical device separate from the VSC 26, or it may be integrated into the software of another controller.

The HEC 22 is a primary control device for maintaining the balance of currents on the bus 14. The HEC 22 acts as a bidirectional gateway for controlling battery current flow. On the high voltage load side of the bus 14, the HEC 22 acts like a voltage regulator. As described more fully below, the HEC controller 24 receives a current command (I CMD) from a second, or closed loop controller (CLC) 28. The HEC controller 24 then signals the HEC 22, which adjusts the battery current flow. Of course, the CLC 28 may send many current commands to the HEC controller 24 for continuously adjusting the battery current flow as a system equilibrium is sought. Like the HEC controller 24, the CLC 28 may be a software controller, for example, part of a control algorithm that the VSC 26 is programmed and configured to execute. Alternatively, the CLC 28 may be a separate physical device, or integrated into the software of another controller.

A third controller, or fuel cell controller 30, is also part of the system 10. It also may be separate from, or integrated into, the VSC 26. The fuel cell controller 30 is configured to send signals to, and receive signals from, the VSC 26. For example, the VSC 26 may send a current request (I REQ) to the fuel cell controller 30, so that the fuel cell controller 30 will adjust the available fuel cell current in response to a vehicle electrical load change.

In the embodiment shown in FIG. 1, all of the vehicle electrical loads 16, 18 are connected to the bus 14 between the HEC 22 and the fuel cell 12. This is not required for the control system 10 to function; however, such a configuration may have certain advantages. For example, when the vehicle electrical loads are directly connected to the fuel cell 12, as they are in this configuration, the current can flow from the fuel cell 12 to the loads without passing through another device. This is an inherently efficient architecture. In addition, such an architecture may be relatively low in cost, since the battery 20 and HEC 22 need not be large, as they only temporarily fill in current when the fuel cell 12 cannot immediately provide it.

When a change in any of the vehicle loads first occurs, it is detected by the VSC 26. For example, if a vehicle occupant initiates a request for cool air from a vehicle air conditioning system, and an air conditioning compressor is started, the air conditioning compressor would then signal the VSC 26 with a current request (I REQ). The VSC 26 would, in turn, send the current request to the fuel cell controller 30. The fuel cell controller 30 would then adjust (in this example, increase) the available fuel cell current to provide the additional current required by the air conditioning compressor.

Although the fuel cell 12 may ultimately provide all the current required to maintain all of the vehicle electrical loads, it may not be possible for it to immediately provide the additional current required when loads suddenly increase. In such situations, the battery 20 may provide the necessary current more quickly than the fuel cell 12, thereby helping to ensure that the system 10 can respond quickly to electrical load changes. Thus, as illustrated In FIG. 1, the VSC 26 not only communicates the current request (I REQ) to the fuel cell controller 30, but also applies it to certain fuel cell characteristics, in this embodiment a V-I polarization curve 32.

A polarization curve is a voltage versus current plot that describes the stable equilibrium points of devices such as fuel cells and batteries. Polarization curves change not only from one fuel cell to another, but also change within a single fuel cell for different operating states. Thus, the relationship between voltage and current in a fuel cell is not adequately described by a single polarization curve. This is because the polarization curve is dependent upon the temperature of the fuel cell and other parameters.

Figure 2:
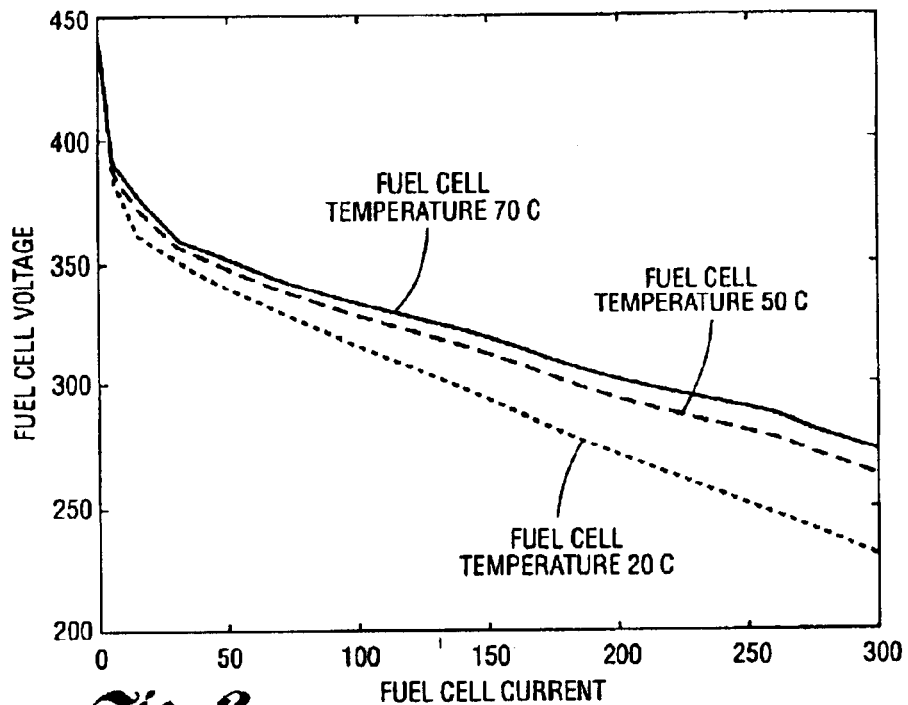
FIG. 2 shows a family of V-I polarization curves for a fuel cell.

FIG. 2 shows a family of polarization curves for a fuel cell, such as the fuel cell 12, shown in FIG. 1. It is readily seen that there is a generally inverse relationship between voltage and current—i.e., as one increases, the other decreases. Moreover, the curves themselves change as the fuel cell temperature changes. Thus, in order to efficiently use a polarization curve for a given fuel cell, a family of curves may be used that define the voltage/current relationship over the operating temperatures of the fuel cell.

Returning to FIG. 1, the V-I polarization curve 32 represents a family of curves, the characteristics of which are programmed into the VSC 32. Of course, fuel cell characteristics, such as V-I polarization curves, may be programmed into a separate computer that is in electrical communication with the VSC 26. Applying the requested current (I REQ) to the V-I polarization curve 32 yields a first voltage, or reference voltage (V REF). The reference voltage (V REF) is summed with a measured voltage (V MEAS) at a summing junction 34. This yields a voltage error (V ERR) that is ultimately sent to the CLC 28.

It is the voltage error (V ERR) that the CLC 28 uses to generate the current command (I CMC) that is sent to the HEC controller 24. By using the V-I polarization curve 32 to generate the reference voltage (V REF), the system 10 can be monitored using the measured voltage (V MEAS) instead of a measured current. Because a voltage sensor will be present in most control systems, such as the system 10, the need to add current sensors is obviated. In addition, the measured voltage (V MEAS) can be picked up in one location on the bus 14; whereas, if current measurements are used, it may be necessary to take them in multiple locations. Thus, an overall cost savings may be realized by using a control system, such as the system 10, that utilizes a single voltage measurement.

As seen in FIG. 1, the voltage error (V ERR) may pickup some disturbance voltage (V DIST) prior to reaching the CLC 28. The disturbance voltage may result from system noise, caused by any one, or a combination, of different electrical loads connected to the bus 14. The CLC 28, which may be a proportional plus integral plus derivative controller, receives the voltage signal from the VSC 32, and calculates a current command (I CMD), which it sends to the HEC controller 24.

In this way, the HEC 22 can be commanded to adjust the battery current flow to compensate for a vehicle electrical load change. Thus, the battery 20 may respond to a load change by providing more current to the bus 14, such as when a load increases, or it may respond by taking current from the bus 14, such as when a load quickly drops. Of course, as the HEC 22 is adjusting the battery current flow to compensate for load changes, the VSC 26, in conjunction with the fuel cell controller 30, is adjusting the available fuel cell current.

A goal of the system 10 is to reach an equilibrium state, such that all of the current required by the vehicle electrical loads is provided by the fuel cell 12. Thus, after initially adjusting the battery current flow based on an initial current command (I CMD), the VSC 28 provides additional current commands to bring the battery current flow to a predetermined constant. The predetermined constant may be zero, or may be another value, and can be programmed into the VSC 26. The additional current commands may be based on how long it will take the fuel cell 12 to compensate for the change in the vehicle electrical loads. This rate may be a predetermined rate, based on known characteristics of the fuel cell 12. The predetermined rate may be provided by a fuel cell manufacturer, or may be empirically generated for a given fuel cell, or class of fuel cells.

Figure 3:
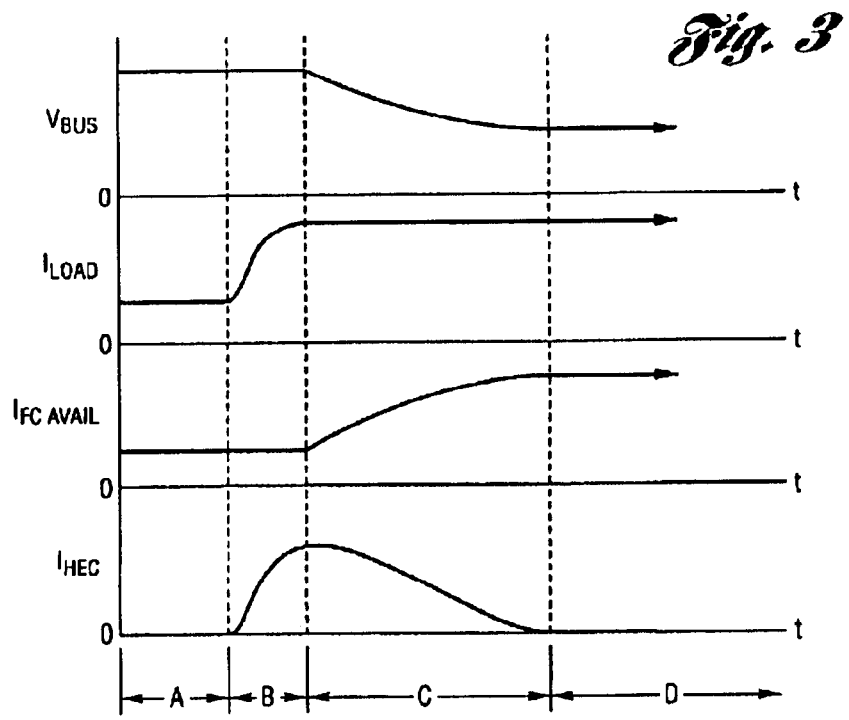
FIG. 3 is a graph illustrating the relationship between bus voltage, vehicle electrical loads, available fuel cell current, and battery current flow.

FIG. 3 illustrates the relationship over time (t) between the bus voltage (V BUS), the vehicle loads (I LOAD), the fuel cell current available (I FC AVAIL), and the battery current flow (I HEC) when a vehicle load changes. For clarity, all the vehicle electrical loads are represented by (I LOAD). Thus, the sum of the available fuel cell current (I FC AVAIL) and the battery current flow (I HEC) equals the vehicle electrical load (I LOAD). Initially, the system is at equilibrium (Time A). During this time, all of the vehicle current load is being provided by the fuel cell (I LOAD =I FC AVAIL). At the end of Time A, a vehicle load increases. As seen in FIG. 3, the available fuel cell current does not initially change. This may be due, in part, to the slow response time characteristic of fuel cells.

The battery current (I HEC) quickly changes in response to the vehicle load change. With reference to FIG. 1, the vehicle load increase would be detected by the VSC 26, which may receive a current request (I REQ) directly from a module, such as an air conditioning compressor. The VSC 26 then applies the current request (I REQ) to the V-I polarization curve 32 to generate the reference voltage (V REF). The measured voltage (V MEAS) is picked up on the bus 14 and subtracted from the reference voltage to generate the voltage error (V ERR).

The voltage error may pickup a disturbance voltage (V DIST) prior to being input into the CLC 28. The CLC 28 generates a current command (I CMD), which is sent to the HEC controller 24. The HEC controller 24 then signals the HEC 22 to increase the battery current flow to compensate for the load change. The change in battery current flow is seen in FIG. 3, occurring during (Time B). During Time B, the battery current flow may receive additional adjustments based on the measured voltage, so that the increase in battery current flow tracks the load increase.

As discussed above, VSC 26 will also send the current request (I REQ) to the fuel cell controller 30. Because the load change in this example is a load increase, an increase in current will be requested from the fuel cell 12. At the end of Time B, the fuel cell 12 begins to generate additional current. This is illustrated in FIG. 3 by the rising (I FC AVAIL) curve.

During Time C, the available fuel cell current continues to increase based on the fuel cell current requested by the fuel cell controller 30. Also during Time C, the battery current flow is continuously adjusted, in this example decreased, in conjunction with the increase in available fuel cell current. The battery current flow is decreased based on a predetermined rate of change of available fuel cell current (I FC AVAIL). As discussed above, the predetermined rate can be programmed into the VSC 26, such that the VSC 26, in conjunction with the CLC 28, generates additional current commands to continuously adjust the battery current flow until equilibrium is reached. Finally, at the end of Time C, the available fuel cell current is equal to the vehicle electrical load (I LOAD), and the battery current flow is zero. Thus, the system is in equilibrium, where it remains during Time D until another load change occurs.

Although the discussion above Involved a load increase, a similar situation occurs in the case of a load decrease. Specifically, a decrease in current load would result in a voltage increase on the bus 14, and the reduced current load request would be detected by the VSC 26. The battery current flow would then be decreased to compensate for this change. In fact, the HEC 22 may direct current flow into the battery 20, thereby facilitating regeneration. In addition, the motor 16 may be configured to use excess current in the event of a sharp load decrease. The fuel cell current requested would then decrease over time, and the battery current flow would be adjusted in conjunction with this decrease. The system would again reach equilibrium, and maintain a steady-state condition until another vehicle electrical load change.

While the best mode for carrying out the invention has been described in detail, those familiar with the art to which this invention relates will recognize various alternative designs and embodiments for practicing the invention as defined by the following claims.

What is claimed is:

1. A power distribution control system for a vehicle having a fuel cell and a second power source connected to an electrical bus, the control system comprising:
    a voltage regulator configured to control voltage on the bus;
    a first controller for controlling the voltage regulator;
    a computer programmed and configured with fuel cell characteristics for relating fuel cell voltage to fuel cell current, the computer being further programmed and configured to receive a current request at least partly based on vehicle loads, and to determine a first voltage related to the current request using the fuel cell characteristics; and
    a second controller configured to receive a voltage signal from the computer and to provide a current command to the first controller, the voltage signal being at least partly based on the first voltage and a measured voltage.

2. The control system of claim 1, wherein the second power source is one of a nickel metal hydride battery, a lead acid battery, and an ultra-capacitor.

3. The control system of claim 1, further comprising a third controller for controlling the fuel cell.

4. The control system of claim 1, wherein the computer is further programmed and configured to execute control algorithms, the control algorithms including the first controller, the second controller, and the third controller.

5. The control system of claim 1, wherein the voltage regulator and the fuel cell are disposed on the bus such that all vehicle electrical loads connect to the bus between the voltage regulator and the fuel cell.

6. The control system of claim 1, wherein the fuel cell characteristics comprise a plurality of fuel cell polarization curves.

7. The control system of claim 1, wherein the voltage signal received by the second controller is a voltage error, the voltage error being the difference between the first voltage and a measured voltage.

8. The control system of claim 1, wherein the second controller is further configured to provide current commands to the first controller to achieve a target current flow for the second power source.

9. The control system of claim 7, wherein the target current flow for the second power source is a predetermined constant.

10. A method of controlling the power distribution in a vehicle having a fuel cell and a second power source, the method comprising:
    generating a first voltage based on a vehicle electrical load change;
    generating a first current command at least partly based on the first voltage and a measured voltage;
    adjusting current flow of the second power source at least partly based on the current command;
    adjusting available fuel cell current at least partly based on the vehicle electrical load change;
    continuously adjusting current flow of the second power source at least partly based on additional current commands until an equilibrium point is reached.

11. The method of claim 9, wherein the equilibrium point is reached when the current flow of the second power source is a predetermined constant.

12. The method of claim 9, wherein the first current command is generated at least partly based on a voltage error, the voltage error being the difference between the first voltage and the measured voltage.

13. The method of claim 9, wherein the continuous adjustment of the current flow occurs at a predetermined rate, the predetermined rate being based on calibrated fuel cell current output.

14. The method of claim 9, wherein the first voltage is generated by applying a current request to a fuel cell polarization curve.

15. The method of claim 14, wherein the fuel cell polarization curve is chosen from a family of curves based on fuel cell operating conditions.

16. The method of claim 9, wherein the current command is partly based on a disturbance voltage.

17. A vehicle having a fuel cell and a second power source connected to an electrical bus, and a power distribution system for controlling the distribution of power in the vehicle, the power distribution system comprising:
    a voltage regulator configured to control voltage on the bus;
    a first controller for controlling the voltage regulator;
    a computer programmed and configured with fuel cell characteristics for relating fuel cell voltage to fuel cell current, the computer being further programmed and configured to receive a current request at least partly based on vehicle loads, and to determine a first voltage related to the current request using the fuel cell characteristics; and
    a second controller configured to receive a voltage signal from the computer and to provide a current command to the first controller, the voltage signal being at least partly based on the first voltage and a measured voltage.

18. The vehicle of claim 17, wherein the fuel cell characteristics comprise a plurality of fuel cell polarization curves.

19. A controller for controlling the power distribution system in a vehicle, the vehicle having a fuel cell and a second power source, the controller comprising:

an algorithm for generating a first voltage at least partly based on vehicle electrical loads, for generating a current command at least partly based on the first voltage and a measured voltage, for adjusting current flow of the second power source at least partly based on the current command, for adjusting available fuel cell current at least partly based on the vehicle electrical loads, and for continuously adjusting the current flow of the second power source until an equilibrium point is reached.

20. The controller of claim 19, wherein the equilibrium point is reached when the current flow of the second power source is a predetermined constant.

* * * * *